United States Patent
Morovic et al.

(10) Patent No.: US 8,351,076 B2
(45) Date of Patent: Jan. 8, 2013

(54) SMOOTHED ENTRIES IN A COLOR TRANSFORMATION LOOK-UP TABLE

(75) Inventors: Jan Morovic, Colchester Essex (GB); Jordi Arnabat Benedicto, L'Arboç (ES); Manuel Angel Alberran Moyo, Barcelona (ES); Yvan Richard, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1136 days.

(21) Appl. No.: 12/240,077

(22) Filed: Sep. 29, 2008

(65) Prior Publication Data

US 2009/0128869 A1     May 21, 2009

Related U.S. Application Data

(60) Provisional application No. 60/989,261, filed on Nov. 20, 2007.

(51) Int. Cl.
    *H04N 1/40*         (2006.01)
(52) U.S. Cl. ....................... 358/1.9; 358/1.16
(58) Field of Classification Search ............ 358/1.9, 358/2.1, 1.16, 3.23, 468, 500, 504, 518
See application file for complete search history.

(56) References Cited

U.S. PATENT DOCUMENTS

| | | | |
|---|---|---|---|
| 6,178,008 B1 | 1/2001 | Bockman | |
| 6,301,025 B1 | 10/2001 | DeLean | |
| 6,791,716 B1 | 9/2004 | Buhr | |
| 6,894,806 B1 | 5/2005 | Woolfe | |
| 6,952,494 B2 | 10/2005 | Odagiri | |
| 7,251,058 B2 | 7/2007 | Pop | |
| 7,263,218 B2 | 8/2007 | Altenhof-long | |
| 2005/0135672 A1 | 6/2005 | Altenhof-long | |
| 2006/0244982 A1 | 11/2006 | Zeng | |
| 2007/0046690 A1 | 3/2007 | Madden | |

FOREIGN PATENT DOCUMENTS

| | | | |
|---|---|---|---|
| JP | 2004023196 A | * | 1/2004 |
| JP | 2004336815 A | * | 11/2004 |
| JP | 2005144974 | | 6/2005 |
| JP | 2007055089 | | 3/2007 |

\* cited by examiner

*Primary Examiner* — Thomas D Lee
*Assistant Examiner* — Stephen M Brinich

(57) ABSTRACT

A color transformation table is constructed in an imaging device. Unsmoothed entries are placed in a table. The unsmoothed entries are replaced by smoothed entries. The smoothed entries are indexed by a color dimensional value for each color dimension in a first color space. Each smoothed entry is a color dimensional value for a color dimension within a second color space. A first unsmoothed entry is replaced with a first smoothed entry, so that the first smoothed entry is a weighted mean of a subset of unsmoothed entries. The subset of unsmoothed entries includes the first unsmoothed entry and other unsmoothed entries that are indexed by the same color dimensional values as the first unsmoothed entry for all but a first color dimension in the first color space.

20 Claims, 3 Drawing Sheets

LUT ENTRIES (UNSMOOTHED)

L+1

|     | a-1 | a   | a+1 |
| --- | --- | --- | --- |
| b+1 | 130 | 120 | 120 |
| b   | 110 | 95  | 90  |
| b-1 | 105 | 80  | 90  |

L

|     | a-1 | a   | a+1 |
| --- | --- | --- | --- |
| b+1 | 80  | 90  | 100 |
| b   | 70  | 80  | 80  |
| b-1 | 100 | 70  | 50  |

L-1

|     | a-1 | a   | a+1 |
| --- | --- | --- | --- |
| b+1 | 70  | 85  | 90  |
| b   | 60  | 72  | 60  |
| b-1 | 90  | 50  | 60  |

FIGURE 3

SMOOTHED ENTRIES IN A COLOR TRANSFORMATION LOOK-UP TABLE

CROSS-REFERENCE TO RELATED APPLICATION

This Utility Patent Application is based on and claims the benefit of U.S. Provisional Application No. 60/989,261, filed on Nov. 20, 2007 the contents of which are hereby incorporated by reference in their entirety.

BACKGROUND

Imaging devices such as printers, cameras and scanners provide color output on the basis of color transformation look-up tables (LUTs) that contain color data. The color transformation look-up tables are used to transform color data from one color space to another color space.

In many cases use of LUTs can result in lack of smoothness if the LUTs are built with only accurate color output in mind. What is meant by lack of smoothness is that the transitions between adjacent colors in the LUT can be abrupt and therefore noticeable.

To increase smoothness, entries within an LUT can be modified to promote smooth transitions between adjacent colors. However, current methods to increase smoothness can significantly decrease the accuracy of color output. It is desirable, therefore, to promote smooth transitions between adjacent colors while limiting the loss of color accuracy.

BRIEF DESCRIPTION OF THE DRAWINGS

FIG. 3 shows a color transformation look-up table in which entries are to be smoothed in accordance with an embodiment of the present invention.

DESCRIPTION OF THE EMBODIMENT

Figure 1:
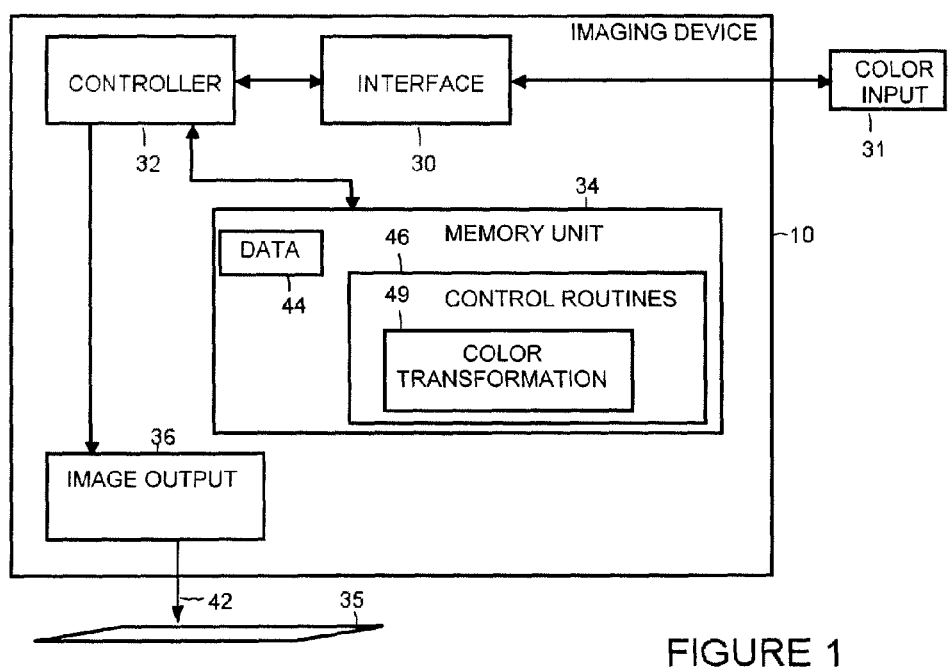
FIG. 1 is a simplified block diagram of an imaging device where color has been smoothed in a color transformation look-up table in accordance with an embodiment of the present invention.

FIG. 1 is a simplified block diagram of an example imaging device 10 that uses a color transformation look-up table. For example, imaging device 10 is a printer. However, as will be understood by a person of ordinary skill in the art, color transformation look-up tables are used by other imaging devices such as scanners, displays, projectors and cameras. The smoothing of transitions in color transformation look-up tables can be used in any device that uses a color transformation look-up table and is not limited to printers.

Imaging device 10 includes, for example, a controller 32 that, via an interface unit 30, receives color input 31 from a computer system or some other device, such as a scanner or fax machine. The interface unit 30 facilitates the transferring of data and command signals to controller 32 for imaging purposes. Interface unit 30 also enables imaging device 10 to download image information, for example, to be imaged on a medium 35.

Imaging device 10 includes a memory unit 34. For example, memory unit 34 is divided into a plurality of storage areas that facilitate operation of imaging device 10. For example, the storage areas can include a data storage area 44 and control routines 46. Data storage area 44 receives data files that define the individual pixel values that are, for example, to be imaged as a desired graphical or textual image on medium 35. When imaging device 10 is a printer, this may mean that the printer prints the desired image onto medium 35. When imaging device 10 is a scanner or camera, medium 35 may be, for example, a storage location where the image is electronically stored.

Control routines 46 hold driver routines and the algorithms that facilitate the mechanical control implementation of the various mechanical mechanisms of imaging device 10. For example, the algorithms within control routines 46 control a sheet feeding stacking mechanism for moving a medium through imaging device 10 from a supply or feed tray to an output tray. When imaging device 10 includes a carriage unit, control routines 46 include the routines that control a carriage mechanism that causes the carriage unit to be moved across, for example, a print medium on a guide rod. Control routines 46 also perform color transformation 49.

In operation, imaging device 10 responds to commands by printing or imaging full color or black images on a medium 35, as represented by an arrow 42 in FIG. 1. In addition to interacting with memory unit 34, controller 32 may control a sheet feeding stacking mechanism and, when present, a carriage mechanism. Controller 32 also forwards imaging information to an image output mechanism 36. Image output mechanism 36 may be, for example, a printhead for an inkjet printer, an electron gun for a cathode-ray tube display, or a laser for a laser printer. When imaging device 10 is a scanner or camera, image output mechanism may be a mechanism by which images are stored.

Figure 2:
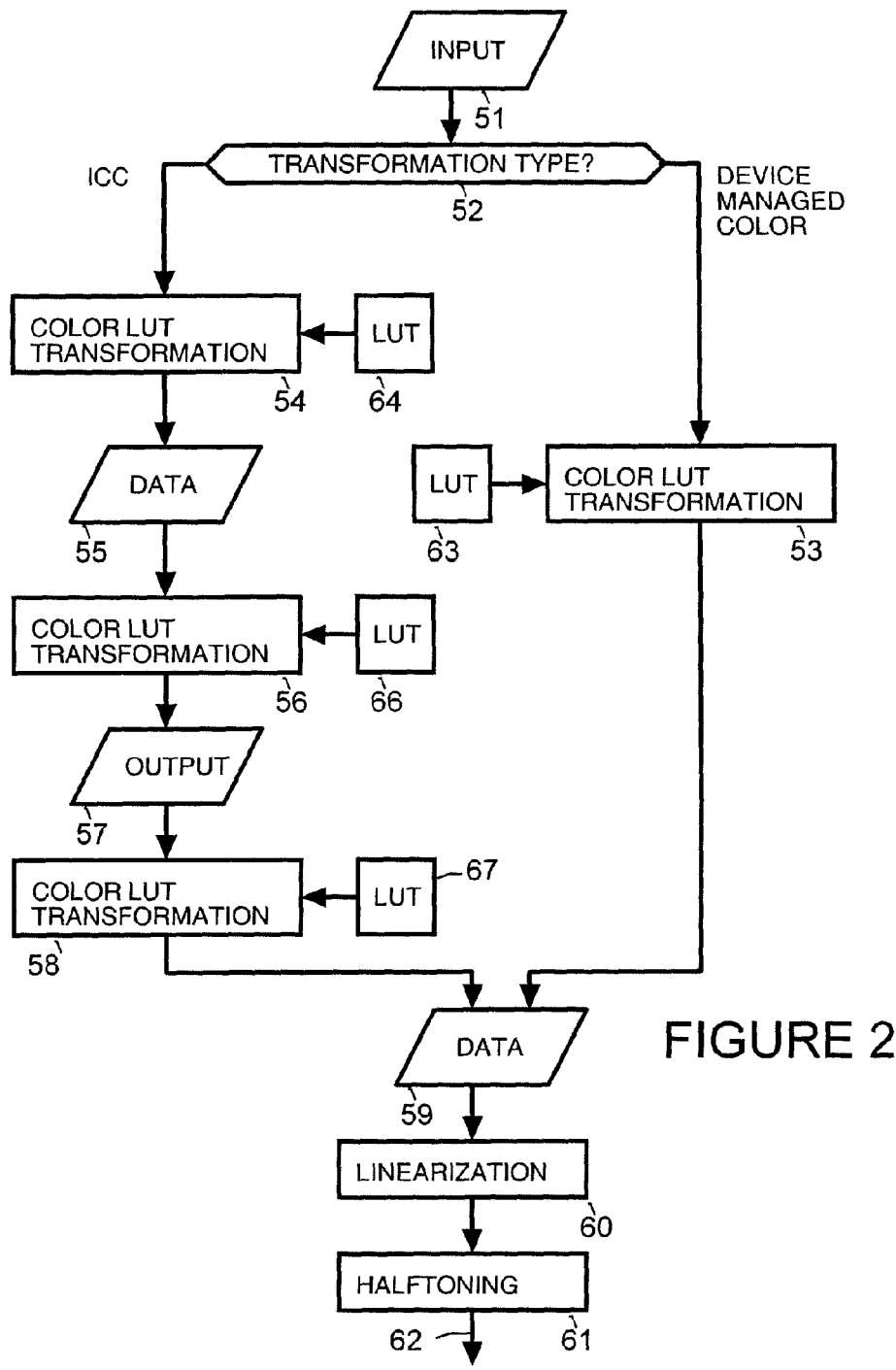
FIG. 2 is a simplified flowchart that illustrates color transformation where entries in a color transformation look-up table have been smoothed in accordance with an embodiment of the present invention.

FIG. 2 is a simplified flowchart that illustrates color transformation where entries in a color transformation look-up table have been smoothed in accordance with an embodiment of the present invention.

Input 51 is color input to be transformed. For example input 51 uses Red-Green-Blue (RGB) color dimensional values to encode color. Alternatively, input 51 uses Cyan-Magenta-Yellow-Black (CMYK) color dimensional values to encode color, or some other scheme to encode color.

In a block 52, a decision is made as to which color transformation scheme is to be used. For example, for a device managed color scheme, only one color look-up table (LUT) transformation may be necessary. This is illustrated in FIG. 2 by a color LUT transformation 53 that uses an LUT 63. LUT 63 provides transformation for the color map of imaging device 10. The result is data 59 that contains continuous-tone data in the colorant channels of imaging device 10.

If in block 52, another scheme, such as an International Color Consortium (ICC) color transformation scheme is selected, more than one color translation may be performed. This is illustrated in FIG. 2 by a color LUT transformation 54 that uses an LUT 64. LUT 64 provides profile information for transforming to CIEXYZ or CIELAB color spaces, referred to as "AToB" in ICC terminology. The result is data 55. Data 55 is in the calorimetric interchange space (e.g., CIELAB) developed by the International Commission on Illumination (Commission Internationale d'Eclairage).

A color LUT transformation 56 uses an LUT 66. LUT 66 provides profile information for transforming from CIEXYZ or CIELAB color spaces, referred to as "BToA" in ICC terminology. The result is output 57. Output 57 uses Red-Green-Blue (RGB) values to encode color. Alternatively, output 57 uses Cyan-Magenta-Yellow-Black (CMYK) values to encode color, or some other scheme to encode color. For example, as described below, LUT 66 includes smoothed entries that have been smoothed in a single color dimension.

A color LUT transformation 58 uses an LUT 68. LUT 68 provides color separation information. The result is data 59 containing the continuous-tone data in the colorant channels of imaging device 10.

After color transformation, additional data manipulation can be performed in preparation for printing or imaging. For example, FIG. 2 shows linearization 60 and halftoning 61 being performed. An arrow 62 represents data flow to printing or imaging the data.

In each of the LUT tables shown in FIG. 2, color smoothing may or may not be performed. This can be performed in a number of ways. For example, smoothness can be performed by replacing each entry in an LUT with a weighted mean of neighboring entries from a $(2n+1)^k$ neighborhood where k is the number of the input color space's dimensions and n is an entry distance that indicates closeness to the entry. For example, an RGB color space has three dimensions (red, green and blue) while a CMYK color space has four dimensions (cyan, magenta, yellow, black) and n determines the size of the neighborhood, centered on the entry to be modified. When n equals 1, this indicates all those neighboring entries that are next to the entry being smoothed. When n equals 2, this indicates all those entries that are separated by at most one entry from the entry being smoothed.

For example, identical weights can be used for each entry in the neighborhood. In this case, a smoothed entry is obtained by replacing an entry with the mean of itself and the entries that make up the neighborhood. Alternatively, greater weight can be assigned to nearer entries, which allows for a localization of the smoothing within the chosen neighborhood. The effect is that each entry is altered to be more like the entries that surround the entry in all directions in the LUT.

In an embodiment of the present invention, smoothness is accomplished by replacing each entry in the LUT by the weighted mean of itself and its 2n neighbors in a single color space dimension. For example for a CIELAB color space, the three color dimensions are lightness (L), redness-greenness (a) and yellowness-blueness (b). The only color dimension that is used for smoothness is lightness (L). Specifically, value of each entry in the LUT is replaced by the weighted mean of itself and the value of its 2n neighbors along the L dimension.

For example, FIG. 3 shows a section 71 of an unsmoothed table used to produce smoothed entries for LUT 66. Section 71 includes 27 unsmoothed entries for LUT 66. Each unsmoothed entry is a value for a single dimension of a color space. For example, each entry can be an "R" "G" or "B" color dimensional value for a transformation into an RGB color space. Alternatively, each entry can be an "C", "M", "Y" or "K" color dimensional value for a transformation into a CMYK color space.

Each entry has an "L" value, an "a" value and a "b" color dimensional value that indexes the entry into the LUT. As can be seen in table 1, the unsmoothed entry (L+1,a−1,b+1) has an entry (or output) value of 130. For example, the entry (or output) value is a color dimensional value for a color dimension within a color space. For example, the output value 130 is a Red (R) value in a Red-Green-Blue (RGB) color space. The unsmoothed entry (L+1,a−1,b) has an entry (or output) value of 110. The unsmoothed entry (L−1,a,b) has an entry (or output) value of 72. And so on.

When section 71 is unsmoothed, section 71 can be smoothed, as discussed above, by replacing each unsmoothed entry with a weighted mean of neighboring unsmoothed entries from a $(2n+1)^k$ neighborhood where k is the number of the input color space's dimensions and n is an entry distance that indicates closeness to the unsmoothed entry.

For example, in section 72 shown in FIG. 3, k is equal to 3 for the three dimensions L, a, b. If n is chosen to be one and all unsmoothed entries are weighted the same, then the unsmoothed entry at (L,a,b), would be replaced by the mean of itself and its 26 nearest neighbors. Thus, the unsmoothed entry at (L,a,b) is replaced by the mean of every unsmoothed entry in Section 71 shown in FIG. 3. The unsmoothed entry value is 80, the smoothed entry value would be the mean of all the entries shown, or 85.07.

Using the embodiment of the present invention where smoothness is accomplished by replacing each unsmoothed entry in the LUT by the weighted mean of itself and its 2n neighbors in a single color space dimension, only three values are used to smooth each entry (for n=1). For example, to smooth the value of the entry (L,a,b) using only the lightness (L) dimension, the mean value of three entries (L−1,a,b), (L,a,b) and (L+1,a,b) is used. Thus the unsmoothed value 80 is replaced by the mean of the three values 72, 80 and 95, that is (72+80+95)/3=82.33.

Similarly, to smooth the value of the unsmoothed entry (L, a−1,b+1) using only the lightness (L) dimension, the mean value of three entries (L−1, a−1,b+1), (L, a−1,b+1) and (L+1, a−1,b+1) are used. Thus the unsmoothed value 80 is replaced by the mean of the three values 70, 80 and 130, that is (70+80+130)/3=93.33.

For example, to smooth the value of the unsmoothed entry (L,a,b) using only the lightness (L) dimension, where the value of the unsmoothed entry itself is weighted twice as much as its two neighbors, the mean value of three entries (L−1,a,b), (L,a,b) and (L+1,a,b) are used with unsmoothed entry (L,a,b) weighted double. Thus the unsmoothed value 80 is replaced by the weighted mean of the three values 72, 80 and 95, that is (72+80*2+95)/4=81.75.

For example, to smooth the value of the unsmoothed entry (L,a,b) using only the lightness (L) dimension and n=2, the mean value of five entries (L−2,a,b), (L−1,a,b), (L,a,b), (L+1, a,b) and (L+2,a,b) are used. And so on.

To a human eye, smoothness in a color transition is predominantly about the smoothness of variation in lightness. Thus smoothing only in the lightness (L) dimension can significantly improve smoothness while limiting any impact smoothing has on the color accuracy produced by a smoothed LUT.

Smoothing can also be performed, for example, for LUTs that are indexed in RGB or CMYK and that have outputs that are CIELAB values. For example, where the LUT is indexed using RGB input values and n=1, than to smooth the CIELAB output values (i.e., L, a, b) at (R, G, B), than for each color dimension of CIELAB, the weighted mean of each of the unsmoothed output dimension value at (R,G,B) is replaced by the weighted mean of the unsmoothed dimension values at (R,G,B), (R+1, G+1, B+1) and (R−1, G−1, B−1). This is because the unsmoothed values at (R+1, G+1, B+1) and (R−1, G−1, B−1) are the two nearest neighbors to (R,G,B) that differ most in lightness L (one being above it and the other below) from the unsmoothed value at (R,G,B). Thus, instead of using the whole $(2n+1)^k$ neighborhood to smooth values in an RGB indexed LUT only use 2n neighbors along a line in RGB for which output values in CIELAB differ most are used. CMYK indexed LUTs can be handled in a similar manner.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

The invention claimed is:

1. An imaging device comprising:
   an interface that receives image data including color data in a first color space;
   a controller that accesses the image data received by the interface, the controller transforming the color data in the first color space to a second color space; and,
   a memory unit, the memory unit storing a table that is used by the controller to transform the color data from the first color space to the second color space, the table comprising:
   a plurality of smoothed entries, each smoothed entry being a color dimensional value for a color dimension within the second color space, the smoothed entries being indexed by a color dimensional value for each color dimension in the first color space;
   wherein the plurality of smoothed entries in the table are equivalent to values that can be obtained by replacing unsmoothed entries for the table with smoothed entries, where a first unsmoothed entry is replaced with a first smoothed entry, the first smoothed entry being a weighted mean of a subset of unsmoothed entries, the subset of unsmoothed entries including the first unsmoothed entry and other unsmoothed entries that are indexed by the same color dimensional values as the first unsmoothed entry for all but a first color dimension in the first color space.

2. An imaging device as in claim 1 wherein the subset of unsmoothed entries includes three unsmoothed entries, the three unsmoothed entries including the first unsmoothed entry and two other unsmoothed entries, the two other unsmoothed entries being indexed by color dimensional values in the first color dimension that are closest to a color dimensional value in the first color dimension use to index the first unsmoothed entry in relation to all other unsmoothed entries that are indexed by the same color dimensional values as the first unsmoothed entry for all but the first color dimension in the first color space.

3. An imaging device as in claim 1 wherein weighted mean is calculated using a same weight for all unsmoothed entries in the subset of unsmoothed entries.

4. An imaging device as in claim 1 wherein the subset of unsmoothed entries includes (2n+1) unsmoothed entries, the (2n+1) unsmoothed entries including the first unsmoothed entry and 2n other unsmoothed entries, the 2n other unsmoothed entries being indexed by color dimensional values in the first color dimension that are closest to a color dimensional value in the first color dimension use to index the first unsmoothed entry in relation to all other unsmoothed entries that are indexed by the same color dimensional values as the first unsmoothed entry for all but the first color dimension in the first color space.

5. An imaging device as in claim 1 wherein the imaging device is one of the following: a printer, a scanner, a camera, a display, a projector.

6. An imaging device as in claim 1 wherein every smoothed entry in the plurality of smoothed entries is replaced with a weighted mean of a subset of unsmoothed entries, wherein the subset of unsmoothed entries includes the unsmoothed entry being replaced plus other unsmoothed entries so that all unsmoothed entries within the subset of unsmoothed entries are indexed by the same color dimensional values for all but the first color dimension in the first color space.

7. An imaging system as in claim 1 wherein the first color space is a CIELAB color space and the first color dimension in the first color space is a light (L) dimension in the CIELAB color space.

8. An imaging system as in claim 1 wherein the first color space is a CIELAB color space and the second color space is a Red-Green-Blue (RGB) color space.

9. An imaging system as in claim 1 wherein the first color space is a CIELAB color space and the second color space is a Cyan-Magenta-Yellow-Black (CMYK) color space.

10. A method performed by an imaging device, the method comprising:
    receiving an interface to the imaging device, image data including color data in the first color space; and
    transforming, by a controller within the imaging device, the color data in the first color space to a second color space, the controller using a color transformation table stored within the imaging device, the transformation table having been constructed by:
    placing unsmoothed entries in a table, and
    replacing the unsmoothed entries with smoothed entries, wherein each smoothed entry is a color dimensional value for a color dimension within the second color space, the smoothed entries being indexed by a color dimensional value for each color dimension in the first color space, including
    replacing a first unsmoothed entry with a first smoothed entry, so that the first smoothed entry is a weighted mean of a subset of unsmoothed entries, the subset of unsmoothed entries including the first unsmoothed entry and other unsmoothed entries that are indexed by the same color dimensional values as the first unsmoothed entry for all but a first color dimension in the first color space.

11. A method as in claim 10 wherein the subset of unsmoothed entries includes three unsmoothed entries, the three unsmoothed entries including the first unsmoothed entry and two other unsmoothed entries, the two other unsmoothed entries being indexed by color dimensional values in the first color dimension that are closest to a color dimensional value in the first color dimension use to index the first unsmoothed entry in relation to all other unsmoothed entries that are indexed by the same color dimensional values as the first unsmoothed entry for all but the first color dimension in the first color space.

12. A method as in claim 10 wherein weighted mean is calculated using a same weight for all unsmoothed entries in the subset of unsmoothed entries.

13. A method as in claim 10 wherein the subset of unsmoothed entries includes (2n+1) unsmoothed entries, the (2n+1) unsmoothed entries including the first unsmoothed entry and 2n other unsmoothed entries, the 2n other unsmoothed entries being indexed by color dimensional values in the first color dimension that are closest to a color dimensional value in the first color dimension use to index the first unsmoothed entry in relation to all other unsmoothed entries that are indexed by the same color dimensional values as the first unsmoothed entry for all but the first color dimension in the first color space.

14. A method as in claim 10 wherein the imaging device is one of the following: a printer, a scanner, a camera, a display, a projector.

15. A method as in claim 10 wherein every smoothed entry in the plurality of smoothed entries is replaced with a weighted mean of a subset of unsmoothed entries, wherein the subset of unsmoothed entries includes the unsmoothed entry being replaced plus other unsmoothed entries so that all unsmoothed entries within the subset of unsmoothed entries are indexed by the same color dimensional values for all but the first color dimension in the first color space.

16. A method as in claim 10 wherein the first color space is a CIELAB color space and the first color dimension in the first color space is a light (L) dimension in the CIELAB color space.

17. A method as in claim 10 wherein the first color space is a CIELAB color space and the second color space is a Red-Green-Blue (RGB) color space or a Cyan-Magenta-Yellow-Black (CMYK) color space.

18. A method for making an imaging device, comprising:
   arranging an interface, a controller and a memory unit so that the controller accesses, from the interface, image data including color data in a first color space and transforms the color data in the first color space to a second color space;
   constructing a color transformation table stored within the memory unit, including the following:
      placing unsmoothed entries in a table; and,
      replacing the unsmoothed entries with smoothed entries, the smoothed entries to be used within the imaging device to transform color from a first color space to a second color space, wherein each smoothed entry is a color dimensional value for a color dimension within the second color space, the smoothed entries being indexed by a color dimensional value for each color dimension in the first color space, including:
         replacing every unsmoothed entry with a weighted mean of a subset of unsmoothed entries, wherein the subset of unsmoothed entries includes the unsmoothed entry being replaced plus other unsmoothed entries so that all unsmoothed entries within the subset of unsmoothed entries are indexed by the same color dimensional values for all but a first color dimension in the first color space.

19. A method used to construct an imaging device, the method comprising:
   arranging an interface, a controller and memory unit so that the controller accesses, from the interface, image data includinq color data in a first color space and transforms the color data in the first color space to a second color Space; and
   constructing a color transformation table stored withthin the memory unit, including
      placing unsmoothed entries in a table, and
      replacing the unsmoothed entries with smoothed entries, wherein each smoothed entry is a color dimensional value for a color dimension within the second color space, the smoothed entries being indexed by a color dimensional value for each color dimension in the first color space, including
         replacing a first unsmoothed entry with a first smoothed entry, so that the first smoothed entry is a weighted mean of a subset of unsmoothed entries, the subset of unsmoothed entries including the first unsmoothed entry and other unsmoothed entries within a predetermined entry distance n of the first unsmoothed entry within the color transformation table, the other unsmoothed entries consisting of 2n entries, within entry distance n of the first unsmoothed entry, whose color dimensional value differ most in a lightness measurement from the color dimension value of the first unsmoothed entry.

20. A method as in claim 19 wherein the entry distance n has a value of one.

* * * * *

UNITED STATES PATENT AND TRADEMARK OFFICE
CERTIFICATE OF CORRECTION

PATENT NO. : 8,351,076 B2  
APPLICATION NO. : 12/240077  
DATED : January 8, 2013  
INVENTOR(S) : Jan Morovic et al.

Page 1 of 1

It is certified that error appears in the above-identified patent and that said Letters Patent is hereby corrected as shown below:

On the Title page, in field (75), Inventors, in column 1, line 3, delete "Alberran" and insert -- Albarran --, therefor.

In column 5, line 6, in Claim 1, delete "image data" and insert -- image data, the image data --, therefor.

In column 5, line 47, in Claim 4, delete "(2n +1)" and insert -- (2n+1) --, therefor.

In column 5, line 48, in Claim 4, delete "(2n +1)" and insert -- (2n+1) --, therefor.

In column 6, line 13, in Claim 10, after "receiving" insert -- by --.

In column 6, line 14, in Claim 10, delete "the" and insert -- a --, therefor.

In column 6, line 14, in Claim 10, delete "and" and insert -- and, --, therefor.

In column 8, line 6, in Claim 19, after "and" insert -- a --.

In column 8, line 8, in Claim 19, delete "includinq" and insert -- including --, therefor.

In column 8, line 10, in Claim 19, delete "Space; and" and insert -- space; and, --, therefor.

In column 8, line 11, in Claim 19, delete "withthin" and insert -- within --, therefor.

Signed and Sealed this  
Second Day of April, 2013

Teresa Stanek Rea  
*Acting Director of the United States Patent and Trademark Office*